US012087210B2

(12) United States Patent
Gao

(10) Patent No.: US 12,087,210 B2
(45) Date of Patent: Sep. 10, 2024

(54) PIXEL-DRIVING CIRCUIT AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Lei Gao, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/622,645

(22) PCT Filed: Dec. 17, 2021

(86) PCT No.: PCT/CN2021/139278
§ 371 (c)(1),
(2) Date: Jun. 15, 2023

(87) PCT Pub. No.: WO2023/103050
PCT Pub. Date: Jun. 15, 2023

(65) Prior Publication Data

US 2024/0029628 A1 Jan. 25, 2024

(30) Foreign Application Priority Data

Dec. 8, 2021 (CN) ......................... 202111493239.3

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/027* (2013.01)

(58) Field of Classification Search
CPC ....... G09G 3/3233; G09G 3/32; G09G 3/3208
See application file for complete search history.

(56) References Cited

U.S. PATENT DOCUMENTS 11,615,747 B2 * 3/2023 Wang .................. G09G 3/2003 345/690
2008/0284691 A1 11/2008 Chung et al.
2014/0049458 A1 2/2014 Cho et al.

FOREIGN PATENT DOCUMENTS

CN 1323023 A 11/2001
CN 107039003 A 8/2017
(Continued)

*Primary Examiner* — Koosha Sharifi-Tafreshi
(74) *Attorney, Agent, or Firm* — The Roy Gross Law Firm, LLC; Roy Gross

(57) ABSTRACT

A pixel-driving circuit and a display device are provided. The pixel-driving circuit includes a switching circuit and a driving circuit. The switching circuit is activated according to one of first and second scan signals to provide a corresponding one of first and second data signals. The driving circuit is connected with the switching circuit and a light-emitting component, and generates a driving current according to the corresponding one of the first and second data signals to drive the light-emitting component. In driving periods of the first and second data signals, the first and second data signals are pulse signals having sub-cycles with different driving periods. By providing the first and second data signals with different time sequence of the sub-cycles to alternately drive the light-emitting component, a ratio cycle of the smallest sub-cycle is enhanced, thereby reducing the driving frequency.

18 Claims, 5 Drawing Sheets

(56) References Cited

FOREIGN PATENT DOCUMENTS

| | | | | | |
|---|---|---|---|---|---|
| CN | 110634442 | A | | 12/2019 | |
| CN | 111210767 | A | | 5/2020 | |
| CN | 111354298 | A | | 6/2020 | |
| CN | 111369935 | A | | 7/2020 | |
| CN | 112767873 | A | * | 5/2021 | ............... G09G 3/32 |
| CN | 112785972 | A | | 5/2021 | |
| CN | 113327556 | A | | 8/2021 | |
| WO | 2021174648 | A1 | | 9/2021 | |

* cited by examiner

PIXEL-DRIVING CIRCUIT AND DISPLAY DEVICE

CROSS REFERENCE TO RELATED APPLICATIONS

This application is a National Phase of PCT Patent Application No. PCT/CN2021/139278 having International filing date of Dec. 17, 2021, which claims the benefit of priority of Chinese Application No. 202111493239.3 filed on Dec. 8, 2021. The contents of the above applications are all incorporated by reference as if fully set forth herein in their entirety.

FIELD OF INVENTION

The present disclosure relates to the field of display driving technology, and more particularly, to a pixel-driving circuit.

BACKGROUND OF INVENTION

At present, with pursuit of high color gamut, high contrast, and ultra-thin appearance, organic light-emitting diode (OLED) panel technology has become the focus in the display field because of its characteristics of lightness, thinness, and flexibility. However, OLED still has the problems of light attenuation and screen burn-in, which greatly affect the service life of OLED display devices. Therefore, mini light-emitting diode, (Mini-LED) has been developed. Mini-LED is made of inorganic materials and has the advantages of higher brightness, better luminous efficiency, and lower power consumptions than the existing OLED.

For the direct display technology of Mini-LED, since the display quality of LED is directly affected by the color shift due to low current, a driving mode of pulse width modulation (PWM) is provided to improve the problem of low gray-scale color shift. For Mini-LED pixels, there are mainly two driving manners of PWM: sub-cycles with equivalent periods and sub-cycles with different periods. In both manners, all pixels in each sub-cycles have to be refreshed. For the driving manner of sub-cycles with equivalent periods, there exists a time that LED does not emit light in each sub-cycle except the largest sub-cycle, resulting in serious loss of the display brightness. For the manner of sub-cycles with different periods, the brightness can be guaranteed without loss, but the refresh time of the smallest sub-cycle is too short. Therefore, the frequency of the driving chip is very high, so that it cannot achieve high resolution or more sub-cycles for a splicing unit in this manner.

SUMMARY OF INVENTION

Technical Problem

A pixel-driving circuit and a display device are disclosed in the present disclosure to solve the problem that the driving frequency of the existing pixel-driving circuit is too high.

Technical Solutions

In order to solve the aforementioned problem, one aspect of the present disclosure is to provide a pixel-driving circuit including a switching circuit and a driving circuit. The switching circuit is configured for being activated according to one of a first scan signal and a second scan signal to provide a corresponding one of a first data signal and a second data signal. The driving circuit is connected with the switching circuit and a light-emitting component, wherein the driving circuit is configured for generating a driving current according to the corresponding one of the first data signal and the second data signal, and to provide the driving current to drive the light-emitting component. In driving periods of the first data signal and the second data signal, the first data signal and the second data signal are pulse signals having sub-cycles with different driving periods.

In some embodiments, in all sub-cycles included in a total of the driving periods of the first data signal and the second data signal, the first data signal is a pulse signal having odd sub-cycles, and the second data signal is a pulse signal having even sub-cycles.

In some embodiments, the total of the driving periods of the first data signal and the second data signal includes seven sub-cycles, the first data signal is the pulse signal having a first sub-cycle, a third sub-cycle, a fifth sub-cycle, and a seventh sub-cycle, and the second data signal is the pulse signal having a second sub-cycle, a fourth sub-cycle, and a sixth sub-cycle.

In some embodiments, for the driving period of each of the sub-cycles: the seventh sub-cycle>the sixth sub-cycle>the fifth sub-cycle>the fourth sub-cycle>the third sub-cycle>the second sub-cycle>the first sub-cycle.

In some embodiments, the switching circuit alternately provides the first data signal and the second data signal to the driving circuit according to a sequence of the sub-cycles of the first data signal and the second data signal.

In some embodiments, the switching circuit includes a first transistor and a second transistor. A gate terminal of the first transistor is configured for receiving the first scan signal, and a first terminal of the first transistor is configured for receiving the first data signal. A gate terminal of the second transistor is configured for receiving the second scan signal, a first terminal of the second transistor is configured for receiving the second data signal, and a second terminal of the second transistor is connected with a second terminal of the first transistor and the driving circuit.

In some embodiments, the driving circuit includes a third transistor and a storage capacitor. A gate terminal of the third transistor is connected with the second terminals of the first transistor and the second transistor, a first terminal of the third transistor is configured for receiving a first voltage signal, and a second terminal of the third transistor is connected with the light-emitting component. A first terminal of the storage capacitor is connected with the gate terminal of the third transistor, and a second terminal of the storage capacitor is connected with the second terminal of the third transistor.

In some embodiments, the pixel-driving circuit further includes a sensing circuit. The sensing circuit is connected with the driving circuit and the light-emitting component, and is configured for being activated according to a sensing signal to provide a reference signal to the driving circuit for compensation.

In some embodiments, the sensing circuit includes a fourth transistor. A gate terminal of the fourth transistor is configured for receiving the sensing signal, a first terminal of the fourth transistor is connected to the driving circuit, and a second terminal of the fourth transistor is configured for receiving the reference signal.

Another aspect of the present disclosure is to provide a display device including a display panel, a gate-driving chip, a first source-driving chip, and a second source-driving chip. The display panel includes a plurality of pixel-driving circuit described in any one of the aforementioned embodiments. The gate-driving chip is connected with the pixel-driving circuit and configured for providing the first scan signal and the second scan signal. The first source-driving chip is connected with the pixel-driving circuit and configured for providing the first data signal. The second source-driving chip is connected with the pixel-driving circuit and configured for providing the second data signal.

Beneficial Effect:

In the pixel-driving circuit and display device disclosed in the embodiments of the present disclosure, by providing the first data signal (e.g., including odd sub-cycles) and the second data signal (e.g., including even sub-cycles) with different time sequence of sub-cycles to alternately drive the light-emitting component, the duty cycle of the smallest sub-cycle can be increased, thereby reducing the driving frequency.

DESCRIPTION OF DRAWINGS

The technical solutions and other beneficial effects of the present disclosure are obvious by describing the specific embodiments of the present disclosure in combination with the accompanying drawings in detail.

DETAILED DESCRIPTION OF PREFERRED EMBODIMENTS

The technical solutions in the embodiments of the present disclosure are clearly and completely described below in combination with the accompanying drawings in the embodiments of the present disclosure. Obviously, the described embodiments are only a part of the embodiments of the present disclosure rather than all of the embodiments. Based on the embodiments in the present disclosure, all other embodiments obtained by a person of ordinary skill in the art without creative efforts fall within the claim scope of the present disclosure.

Figure 1:
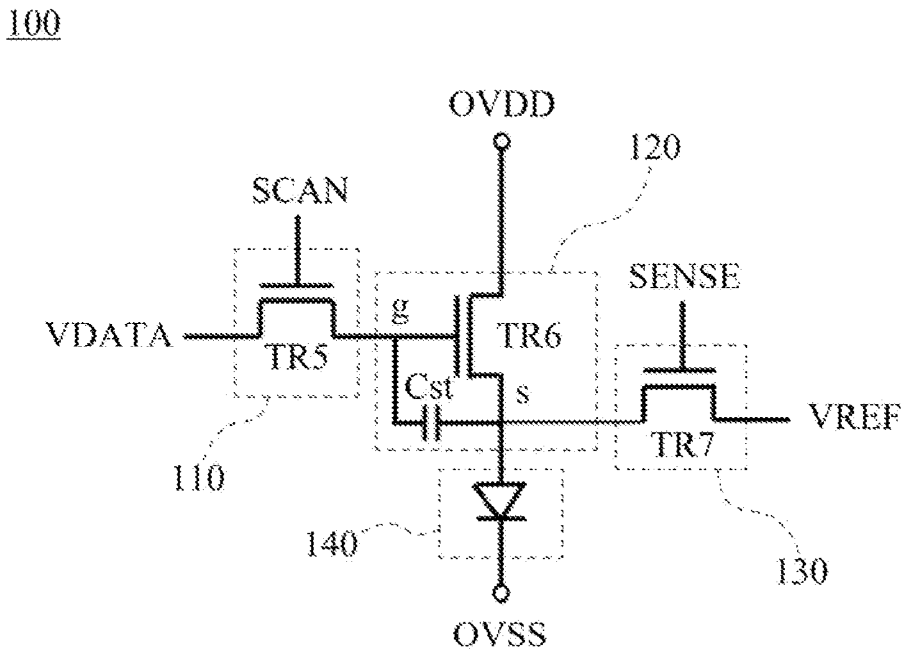
FIG. 1 illustrates a schematic diagram of a pixel-driving circuit according to an embodiment of the present disclosure.

Reference is made to FIG. 1. FIG. 1 illustrates a schematic diagram of a pixel-driving circuit 100 according to an embodiment of the present disclosure. The pixel-driving circuit 100 may be applied to a Mini-LED display device or a Micro-LED display device. In other words, the pixel driven by the pixel-driving circuit 100 may be a light-emitting component 140, such as a Mini-LED or a Micro-LED. As shown in FIG. 1, the pixel-driving circuit 100 includes a switching circuit 110, a driving circuit 120, and a sensing circuit 130. The switch circuit 110 is configured to be activated according to a scan signal SCAN to provide a data signal VDATA to the driving circuit 120. The driving circuit 120 is connected with the switching circuit 110 and the light-emitting component 140, and is configured to generate a corresponding driving current according to the data signal VDATA to drive the light-emitting component 140 to generate a corresponding brightness. The sensing circuit 130 is connected with the driving circuit 120 and the light-emitting component 140, and is configured to be activated according to a sensing signal SENSE to provide a reference signal VREF to the driving circuit 120 for compensation.

In one embodiment, the pixel-driving circuit 100 may be a 3T1C structure. Specifically, the switching circuit 110 may include a transistor TR5. The gate terminal of the transistor TR5 is configured for receiving the scan signal SCAN, the first terminal of the transistor TR5 is configured for receiving the data signal VDATA, and the second terminal of the transistor TR5 is connected to the driving circuit 120. The driving circuit 120 may include a transistor TR6 and a storage capacitor Cst. The gate terminal of the transistor TR6 is connected to the second terminal of the transistor TR5, the first terminal of the transistor TR6 is configured for receiving a first voltage signal OVDD, and the second terminal of the transistor TR6 is connected to the light-emitting component 140. The first terminal of the storage capacitor Cst is connected to the gate terminal of the transistor TR6, and the second terminal of the storage capacitor Cst is connected to the second terminal of the transistor TR6. The sense circuit 130 may include a transistor TR7. The gate terminal of the transistor TR7 is configured for receiving the sensing signal SENSE, the first terminal of the transistor TR7 is connected to the second terminal of the transistor TR6, and the second terminal of the transistor TR7 is configured for receiving the reference signal VREF. An anode terminal of the light-emitting component 140 is connected to the second terminal of the transistor TR6, and a cathode terminal of the light-emitting component 140 is configured for receiving a second voltage signal OVSS.

In one embodiment, when the pixel-driving circuit 100 is under a sensing mode, in the first stage, both the scan signal SCAN and the sensing signal SENSE are high voltage level signals, so that both transistor TR5 and transistor TR7 are conducted. The reference voltage VRED is provided to the node s through the conducted transistor TR7. If VREF=0V, the voltage of the node s is 0V, i.e., Vs=0V. Next, if the output voltage of the data signal VDATA is V1, which is provided to the node g through the conducted transistor TR5, i.e., Vg=V1. At this time, the voltage difference Vgs between the gate terminal and the second terminal of the transistor TR6 is equal to V1 and greater than Vth, so that the transistor TR6 is conducted. Then, in the second stage, the voltage level of the node s is enhanced by increasing the reference voltage VREF until the voltage difference Vgs between the gate terminal and the second terminal of the transistor TR6 is equal to Vth, so that the transistor TR6 is cut off. The reference voltage VREF is charged to Vs, and Vth=V1−Vs at this moment. In this way, the threshold voltage Vth of the transistor TR6 can be extracted. Next, when the pixel-driving circuit 100 is under a display mode, the data voltage VDATA can output the voltage of Vdata+Vth to eliminate the non-uniform brightness caused by the different threshold voltages Vth of different transistors TR6 in the whole display panel, so as to achieve the compensation effect.

Figure 2:
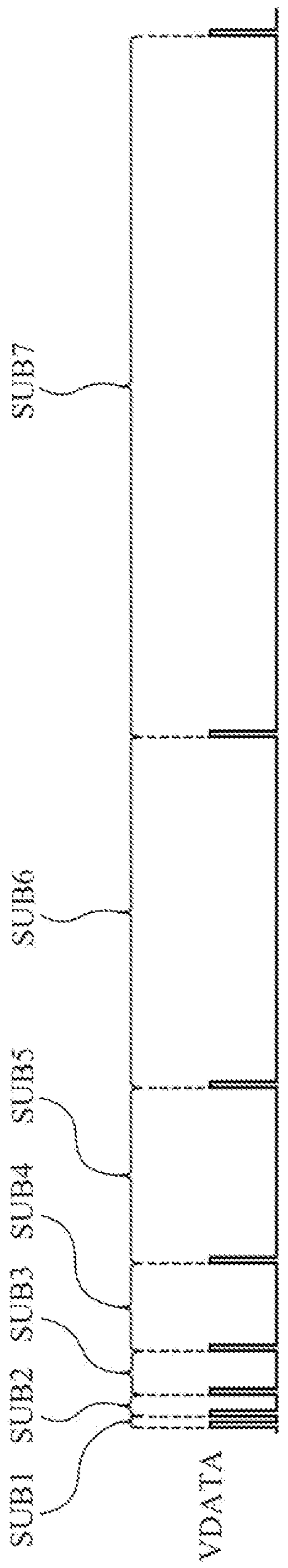
FIG. 2 is a schematic diagram of a waveform of a data signal provided to the pixel-driving circuit of FIG. 1 according to an embodiment.

Reference is also made to FIG. 2 FIG. 2 is a schematic diagram of a waveform of a data signal VDATA provided to the pixel-driving circuit 100 of FIG. 1 according to an embodiment. In the present embodiment, the pixel-driving circuit 100 is driven by a PWM signal having sub-cycles with different periods. The data signal VDATA shown in FIG. 2 may be, for example, a pulse signal that provides the highest gray scale of a pixel, and its driving period may include seven sub-cycles SUB1 to SUB7 with different periods. In each of the sub-cycles, all pixels are driven once. In other words, the data signal VDATA has a pulse in each of the sub-cycles. As can be seen from FIG. 2, in the sequence from the sub-cycle SUB1 to the sub-cycle SUB7, the driving period thereof is greater and greater. That is, the driving period of the sub-cycle SUB7 is greater than that of the sub-cycle SUB6, the driving period of the sub-cycle SUB6 is greater than that of the sub-cycle SUB5, and so on. For the sub-cycle SUB1 with the smallest driving period, the refresh time it can receive is too short, resulting in high frequency requirements for the driving chip. If the resolution of the panel is 120*120 and the display panel uses one gate-driving chip and one source-driving chip, the gate-driving frequency required by the seven sub-cycles SUB1-SUB7 is about 990.6 KHz and the source-driving frequency is about 6.09 GHz. If the resolution is higher, the required driving frequency may be higher. As a result, no suitable chip can support, and the display quality is also affected.

Figure 3:
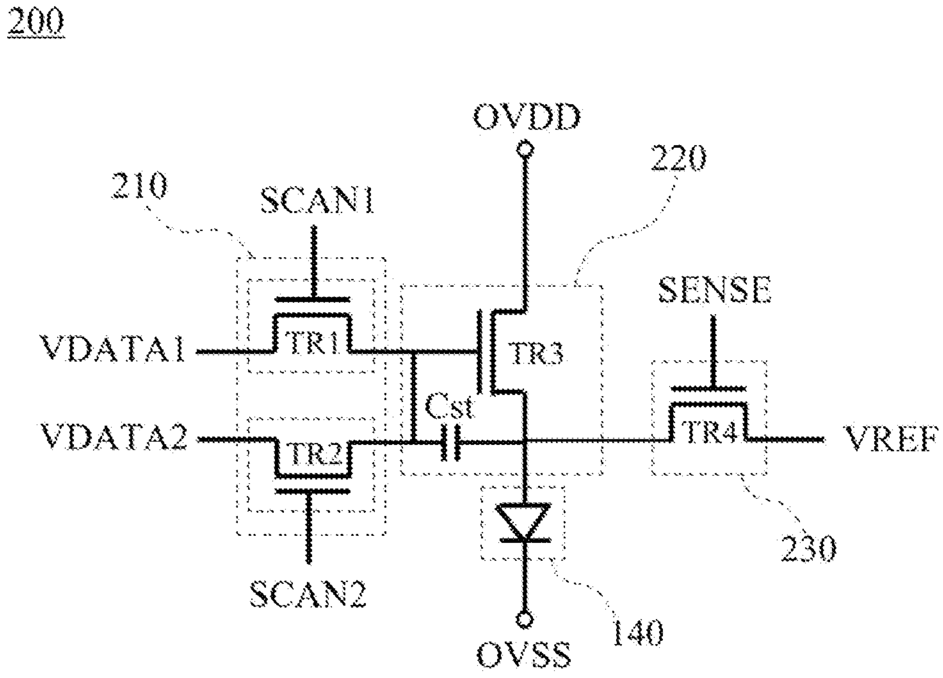
FIG. 3 is a schematic diagram of a pixel-driving circuit according to a preferred embodiment of the present disclosure.

Reference is made to FIG. 3. FIG. 3 is a schematic diagram of a pixel-driving circuit 200 according to a preferred embodiment of the present disclosure. Similarly, the pixel-driving circuit 200 may be applied to a Mini-LED display device or a Micro-LED display device. In other words, the light-emitting component 140 of the pixel-driving circuit 200 may be, for example, a Mini-LED or a Micro-LED. As shown in FIG. 3, the pixel-driving circuit 200 includes a switching circuit 210, a driving circuit 220, and a sensing circuit 230. The switch circuit 110 is configured to be activated according to one of a first scan signal SCAN1 and a second scan signal SCAN2 to provide a corresponding one of a first data signal VDATA1 and a second data signal VDATA2 to the driving circuit 120. The driving circuit 220 is connected with the switching circuit 210 and the light-emitting component 140, and is configured to generate a corresponding driving current according to the first data signal VDATA1 or the second data signal VDATA2 to drive the light-emitting component 140 to generate a corresponding brightness. The sensing circuit 230 is connected with the driving circuit 220 and the light-emitting component 140, and is configured to be activated according to a sensing signal SENSE to provide a reference signal VREF to the driving circuit 220 for compensation.

In one embodiment, the switching circuit 210 may include a first transistor TR1 and a second transistor TR2. The gate terminal of the first transistor TR1 is configured for receiving the first scan signal SCAN1, the first terminal of the first transistor TR1 is configured for receiving the first data signal VDATA1, and the second terminal of the first transistor TR1 is connected to the driving circuit 220. The gate terminal of the second transistor TR2 is configured for receiving the second scan signal SCAN2, the first terminal of the second transistor TR2 is configured for receiving the second data signal VDATA2, and the second terminal of the second transistor TR2 is connected with the second terminal of the first transistor TR1 and the driving circuit 220.

The driving circuit 220 may include a third transistor TR3 and a storage capacitor Cst. The gate terminal of the third transistor TR3 is connected to the second terminals of the first transistor TR1 and the second transistor TR2, the first terminal of the third transistor TR3 is configured for receiving a first voltage signal OVDD, and the second terminal of the third transistor TR3 is connected to the light-emitting component 140. The first terminal of the storage capacitor Cst is connected to the gate terminal of the third transistor TR3, and the second terminal of the storage capacitor Cst is connected to the second terminal of the third transistor TR3.

The sense circuit 230 may include a fourth transistor TR4. The gate terminal of the fourth transistor TR4 is configured for receiving the sensing signal SENSE, the first terminal of the fourth transistor TR4 is connected to the second terminal of the third transistor TR3, and the second terminal of the fourth transistor TR4 is configured for receiving the reference signal VREF. The anode terminal of the light-emitting component 140 is connected to the second terminal of the third transistor TR3, and the cathode terminal of the light-emitting component 140 is configured for receiving a second voltage signal OVSS.

The specific operations of the sense circuit 230 can refer to the aforementioned embodiment and the further description is not provided herein.

Figure 4:
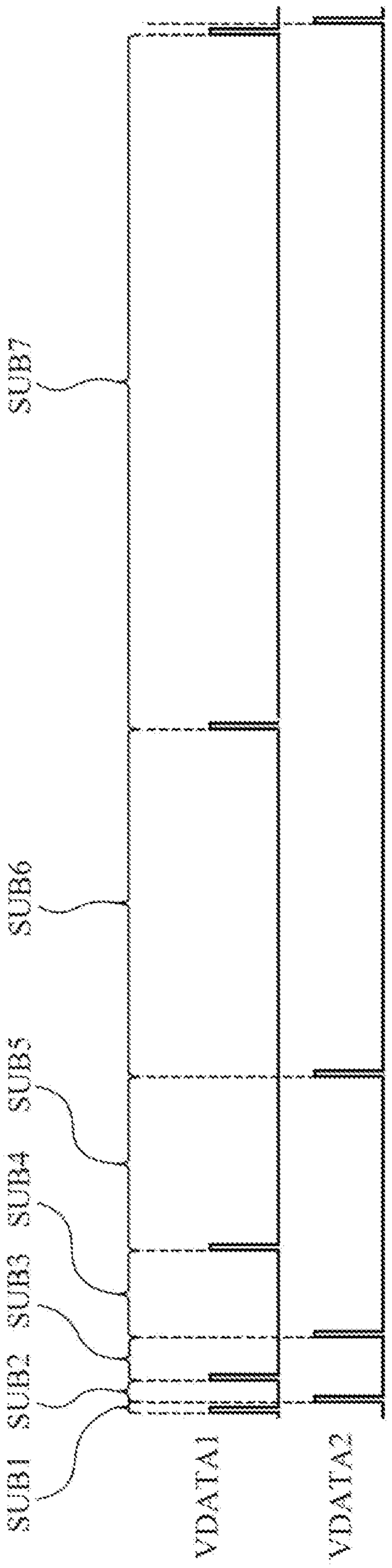
FIG. 4 is a schematic diagram of waveforms of a first data signal and a second data signal provided to the pixel-driving circuit of FIG. 3 according to an embodiment.

In the present embodiment, the pixel-driving circuit 200 is driven by a PWM signal having sub-cycles with different periods. The difference from the pixel-driving circuit 100 is that the switching circuit 210 of the pixel-driving circuit 200 can provide the first data signal VDATA1 and the second data signal VDATA2 to the driving circuit 220 by the first scan signal SCAN1 and the second scan signal SCAN2, respectively. Reference is also made to FIG. 4. FIG. 4 is a schematic diagram of waveforms of a first data signal VDATA1 and a second data signal VDATA2 provided to the pixel-driving circuit 200 of FIG. 3 according to an embodiment. In the present embodiment, as shown in FIG. 4, the first data signal VDATA1 and the second data signal VDATA2 shown in FIG. 4 may be, for example, pulse signals which provide the highest gray-scale data of pixels, and the driving periods of the first data signal VDATA1 and the second data signal VDATA2 include seven sub-cycles SUB1 to SUB7 with different periods, but the present disclosure is not limited thereto. In each of the sub-cycles, all pixels are driven once. In some embodiments, for all sub-cycles included in a total of the driving periods of the first data signal VDATA1 and the second data signal VDATA2 (in this example, i.e., seven sub-cycles SUB1 to SUB7), the first data signal is a pulse signal with odd sub-cycles. That is, the driving period of the first data signal VDATA1 includes odd sub-cycles, i.e., the first sub-cycle SUB1, the third sub-cycle SUB3, the fifth sub-cycle SUB5, and the seventh sub-cycle SUB7. The second data signal VDATA2 is a pulse signal with even sub-cycles. That is, the driving period of the second data signal VDATA2 includes even sub-cycles, i.e., the second sub-cycle SUB2, the fourth sub-cycle SUB4, and the sixth sub-cycle SUB6. For the driving period of each of the sub-cycles: the seventh sub-cycle SUB7>the sixth sub-cycle SUB6>the fifth sub-cycle SUB5>the fourth sub-cycle SUB4>the third sub-cycle SUB3>the second sub-cycle SUB2>the first sub-cycle SUB1.

In some embodiments, the pixel-driving circuit 200 provides the first data signal VDATA1 and the second data signal VDATA2 to the driving circuit 220 to alternately drive the light-emitting component 140 according to the sequence of the sub-cycles of the first data signal VDATA1 and the second data signal VDATA2. Specifically, when the switching circuit 210 turns on the first transistor TR1 and turns off the second transistor TR2 according to the driving period of the sub-cycle SUB1 of the first data signal VDATA1, and provides the first data signal VDATA1 to the driving circuit 220. Next, the switching circuit 210 turns off the first transistor TR1 and turns on the second transistor TR2 according to the driving period of the sub-cycle SUB2 of the second data signal VDATA2, and provides the second data signal VDATA2 to the driving circuit 220, and so on, the driving of the seven sub-cycles is finished. In this way, the driving frequency of the driving chip can be reduced.

In the present embodiment, for the seven sub-cycles SUB1-SUB7, the duty cycle of the smallest sub-cycle is 3/127. For the seven sub-cycles SUB1-SUB7 of the PWM of the pixel-driving circuit 100, the duty cycle of the smallest sub-cycle is 1/127. In other words, the driving frequency decreases by ⅓. That is, if the resolution of the panel is 120*120, the gate-driving frequency required by the seven sub-cycles SUB1-SUB7 of PWM of the pixel-driving circuit 100 is about 330.2 KHz and the source-driving frequency is about 2.03 GHz. Therefore, when the number of sub-cycles is the same, the driving frequency can be greatly reduced. The higher the resolution is, the more obvious the improvement effect may be.

Moreover, if the driving frequency required by the PWM driving of the pixel-driving circuit 200 is the same as that required by the PWM driving of the pixel-driving circuit 100, the PWM driving signal of the pixel-driving circuit 200 may have more sub-cycles, or the refresh rate may be further enhanced.

Figure 5:
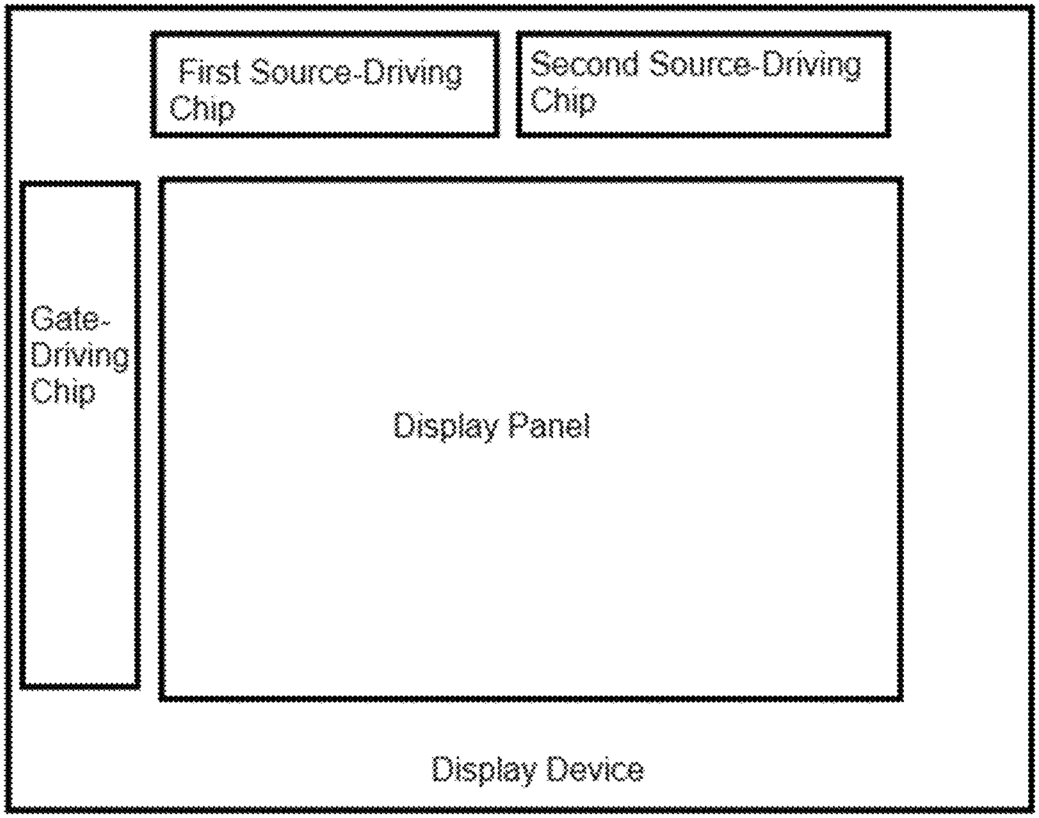
FIG. 5 is a schematic block diagram of a display device according to an embodiment of the present application.

In the present embodiment, the display device using the pixel-driving circuit 200 may include one gate-driving chip and two source-driving chips, as shown in FIG. 5. The gate-driving chip can provide the first scan signal SCAN1 and the second scan signal SCAN2 with different switching timing. The two source-driving chips can provide the first data signal VDATA1 with odd sub-cycles and the second data signal VDATA2 with even sub-cycles, respectively.

To sum up, in the present disclosure, by providing the first data signal (e.g., including odd sub-cycles) and the second data signal (e.g., including even sub-cycles) with different time sequence of sub-cycles to alternately drive the light-emitting component, the duty cycle of the smallest sub-cycle can be increased, thereby reducing the driving frequency.

The technical features in the aforementioned embodiments may be randomly combined. For concise description, not all possible combinations of the technical features in the embodiment are described. However, the combinations of the technical features should all be considered as falling within the scope described in this specification provided that they do not conflict with each other.

The aforementioned embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A pixel-driving circuit, comprising:

a switching circuit configured for being activated according to one of a first scan signal and a second scan signal to provide a corresponding one of a first data signal and a second data signal; and a driving circuit connected with the switching circuit and a light-emitting component, wherein the driving circuit is configured for generating a driving current according to the corresponding one of the first data signal and the second data signal, and to provide the driving current to drive the light-emitting component;

wherein in driving periods of the first data signal and the second data signal, the first data signal and the second data signal are pulse signals having sub-cycles with different driving periods, and wherein in all sub-cycles included in a total of the driving periods of the first data signal and the second data signal, the first data signal is a pulse signal having odd sub-cycles, and the second data signal is a pulse signal having even sub-cycles.

2. The pixel-driving circuit according to claim 1, wherein the total of the driving periods of the first data signal and the second data signal includes seven sub-cycles, the first data signal is the pulse signal having a first sub-cycle, a third sub-cycle, a fifth sub-cycle, and a seventh sub-cycle, and the second data signal is the pulse signal having a second sub-cycle, a fourth sub-cycle, and a sixth sub-cycle.

3. The pixel-driving circuit according to claim 2, wherein for the driving period of each of the sub-cycles: the seventh sub-cycle>the sixth sub-cycle>the fifth sub-cycle>the fourth sub-cycle>the third sub-cycle>the second sub-cycle>the first sub-cycle.

4. The pixel-driving circuit according to claim 1, wherein the switching circuit alternately provides the first data signal and the second data signal to the driving circuit according to a sequence of the sub-cycles of the first data signal and the second data signal.

5. The pixel-driving circuit according to claim 1, wherein the switching circuit comprises a first transistor and a second transistor, a gate terminal of the first transistor is configured for receiving the first scan signal, a first terminal of the first transistor is configured for receiving the first data signal, a gate terminal of the second transistor is configured for receiving the second scan signal, a first terminal of the second transistor is configured for receiving the second data signal, and a second terminal of the second transistor is connected with a second terminal of the first transistor and the driving circuit.

6. The pixel-driving circuit according to claim 5, wherein the driving circuit comprises a third transistor and a storage capacitor, a gate terminal of the third transistor is connected with the second terminals of the first transistor and the second transistor, a first terminal of the third transistor is configured for receiving a first voltage signal, a second terminal of the third transistor is connected with the light-emitting component, a first terminal of the storage capacitor is connected with the gate terminal of the third transistor, and a second terminal of the storage capacitor is connected with the second terminal of the third transistor.

7. The pixel-driving circuit according to claim 1, wherein the pixel-driving circuit further comprises a sensing circuit, the sensing circuit is connected with the driving circuit and the light-emitting component, and is configured for being activated according to a sensing signal to provide a reference signal to the driving circuit for compensation.

8. The pixel-driving circuit according to claim 7, wherein the sensing circuit comprises a fourth transistor, a gate terminal of the fourth transistor is configured for receiving the sensing signal, a first terminal of the fourth transistor is connected to the driving circuit, and a second terminal of the fourth transistor is configured for receiving the reference signal.

9. A display device, comprising:

a display panel comprising a pixel-driving circuit, wherein the pixel-driving circuit comprises:

a switching circuit configured for being activated according to one of a first scan signal and a second scan signal to provide a corresponding one of a first data signal and a second data signal; and a driving circuit connected with the switching circuit and a light-emitting component, wherein the driving circuit is configured for generating a driving current according to the corresponding one of the first data signal and the second data signal, and to provide the driving current to drive the light-emitting component, wherein in driving periods of the first data signal and the second data signal, the first data signal and the second data signal are pulse signals having sub-cycles with different driving periods;

a gate-driving chip connected with the pixel-driving circuit and configured for providing the first scan signal and the second scan signal; a first source-driving chip connected with the pixel-driving circuit and configured for providing the first data signal; and a second source-driving chip connected with the pixel-driving circuit and configured for providing the second data signal, wherein in all sub-cycles included in a total of the driving periods of the first data signal and the second data signal, the first data signal is a pulse signal having odd sub-cycles, and the second data signal is a pulse signal having even sub-cycles.

10. The display device according to claim 9, wherein the total of the driving periods of the first data signal and the second data signal includes seven sub-cycles, the first data signal is the pulse signal having a first sub-cycle, a third sub-cycle, a fifth sub-cycle, and a seventh sub-cycle, and the second data signal is the pulse signal having a second sub-cycle, a fourth sub-cycle, and a sixth sub-cycle.

11. The display device according to claim 10, wherein for the driving period of each of the sub-cycles: seventh sub-cycle>sixth sub-cycle>fifth sub-cycle>fourth sub-cycle>third sub-cycle>second sub-cycle>first sub-cycle.

12. The display device according to claim 9, wherein the switching circuit alternately provides the first data signal and the second data signal to the driving circuit according to a sequence of the sub-cycles of the first data signal and the second data signal.

13. A pixel-driving circuit, comprising:

a switching circuit configured for being activated according to one of a first scan signal and a second scan signal to provide a corresponding one of a first data signal and a second data signal;

a driving circuit connected with the switching circuit and a light-emitting component, wherein the driving circuit is configured for generating a driving current according to the corresponding one of the first data signal and the second data signal, and to provide the driving current to drive the light-emitting component; and a sensing circuit, the sensing circuit is connected with the driving circuit and the light-emitting component, and is configured for being activated according to a sensing signal to provide a reference signal to the driving circuit for compensation, wherein in driving periods of the first data signal and the second data signal, the first data signal and the second data signal are pulse signals having sub-cycles with different driving periods; and wherein in all sub-cycles included in a total of the driving periods of the first data signal and the second data signal, the first data signal is a pulse signal having odd sub-cycles, and the second data signal is a pulse signal having even sub-cycles.

14. The pixel-driving circuit according to claim 13, wherein the total of the driving periods of the first data signal and the second data signal includes seven sub-cycles, the first data signal is the pulse signal having a first sub-cycle, a third sub-cycle, a fifth sub-cycle, and a seventh sub-cycle, and the second data signal is the pulse signal having a second sub-cycle, a fourth sub-cycle, and a sixth sub-cycle.

15. The pixel-driving circuit according to claim 14, wherein for the driving period of each of the sub-cycles: the seventh sub-cycle>the sixth sub-cycle>the fifth sub-cycle>the fourth sub-cycle>the third sub-cycle>the second sub-cycle>the first sub-cycle.

16. The pixel-driving circuit according to claim 13, wherein the switching circuit alternately provides the first data signal and the second data signal to the driving circuit according to a sequence of the sub-cycles of the first data signal and the second data signal.

17. The pixel-driving circuit according to claim 13, wherein the switching circuit comprises a first transistor and a second transistor, a gate terminal of the first transistor is configured for receiving the first scan signal, a first terminal of the first transistor is configured for receiving the first data signal, a gate terminal of the second transistor is configured for receiving the second scan signal, a first terminal of the second transistor is configured for receiving the second data signal, and a second terminal of the second transistor is connected with a second terminal of the first transistor and the driving circuit.

18. The pixel-driving circuit according to claim 17, wherein the driving circuit comprises a third transistor and a storage capacitor, a gate terminal of the third transistor is connected with the second terminals of the first transistor and the second transistor, a first terminal of the third transistor is configured for receiving a first voltage signal, a second terminal of the third transistor is connected with the light-emitting component, a first terminal of the storage capacitor is connected with the gate terminal of the third transistor, and a second terminal of the storage capacitor is connected with the second terminal of the third transistor; and wherein the sensing circuit comprises a fourth transistor, a gate terminal of the fourth transistor is configured for receiving a sensing signal, a first terminal of the fourth transistor is connected to the driving circuit, and a second terminal of the fourth transistor is configured for receiving a reference signal.

* * * * *